(12) United States Patent
Winstead (10) Patent No.: US 7,496,443 B2
(45) Date of Patent: Feb. 24, 2009

(54) EMISSIONS CONTROL

(75) Inventor: Vincent J. Winstead, Mankato, MN (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 11/755,407

(22) Filed: May 30, 2007

(65) Prior Publication Data

US 2008/0300767 A1    Dec. 4, 2008

(51) Int. Cl.
*F02D 41/04* (2006.01)
(52) U.S. Cl. .................. 701/103; 123/90.15; 60/274
(58) Field of Classification Search .................. 701/101, 701/102, 103, 104, 108, 109, 110; 123/90.11, 123/429, 90.15, 443, 700, 704; 60/274, 276, 60/285, 286
See application file for complete search history.

(56) References Cited

U.S. PATENT DOCUMENTS

| 6,155,242 | A | * | 12/2000 | Kotwicki et al. ............ 123/704 |
| 6,390,054 | B1 | * | 5/2002 | Yang ........................... 123/295 |
| 6,953,024 | B2 | * | 10/2005 | Linna et al. .................. 123/435 |
| 6,978,204 | B2 | * | 12/2005 | Surnilla et al. .............. 701/103 |
| 7,021,046 | B2 | * | 4/2006 | Surnilla et al. ................ 60/285 |
| 7,021,276 | B2 | | 4/2006 | Liu et al. |
| 7,165,391 | B2 | * | 1/2007 | Lewis .......................... 60/285 |
| 7,274,986 | B1 | * | 9/2007 | Petridis et al. .............. 701/102 |
| 7,311,079 | B2 | * | 12/2007 | Surnilla et al. .............. 123/325 |
| 7,398,743 | B2 | * | 7/2008 | Fiveland ......................... 123/3 |
| 2004/0182359 | A1 | | 9/2004 | Stewart et al. |
| 2005/0284441 | A1 | | 12/2005 | Liu et al. |
| 2008/0135021 | A1 | * | 6/2008 | Michelini et al. ........... 123/481 |

* cited by examiner

*Primary Examiner*—Stephen K. Cronin
*Assistant Examiner*—Johnny H. Hoang
(74) *Attorney, Agent, or Firm*—Allan J. Lippa; Alleman Hall McCoy Russell & Tuttle LLP (57) ABSTRACT

A system for controlling a multiple cylinder internal combustion engine is presented. The system operates a first portion of cylinders in a homogeneous charge compression ignition (HCCI) mode and a second portion of cylinders in a non-HCCI mode, and uses an engine controller that is coupled to the first and second portions of cylinders to electronically actuate valves to hold a combusted air and fuel charge in the second portion of cylinders, and exhaust the combusted air and fuel charge to adjust the residual air-to-fuel ratio of the engine.

18 Claims, 6 Drawing Sheets

EMISSIONS CONTROL

FIELD

The present application relates to controlling emissions in an engine.

BACKGROUND

Vehicles having an internal combustion engine can operate in a variety of modes. As one example, an engine may operate in a spark ignition (SI) mode, wherein a charge of a mixture of air and fuel is ignited by a spark performed by a sparking device within a combustion chamber. As another example, an engine may operate in a compression ignition mode, wherein a mixture of air and fuel are compressed within a combustion chamber by a piston, causing ignition of the charge without necessarily requiring the addition of a spark from a sparking device.

One type of compression ignition known as homogeneous charge compression ignition (HCCI) utilizes compression of a substantially homogeneous mixture of air and fuel to achieve controlled auto-ignition (CAI). In HCCI engines, ignition occurs virtually simultaneously throughout a combustion chamber as a result of compression instead of spark ignition, making the combustion process challenging to control. HCCI engines are similar to conventional gasoline engines in having a homogeneous charge, but are similar to conventional diesel engines in having compression ignition. HCCI engines may be used to combine gasoline engine low emissions with diesel engine efficiency.

Unfortunately, HCCI combustion engines typically change operation conditions more slowly than other combustion processes. The engine hardware used to control initial cylinder conditions such as internal residuals, intake air temperatures, and the combustion process stability window, limits dynamic response.

Engine control strategies have been developed that switch between combustion modes to increase dynamic response of HCCI engines. In one approach, as described in U.S. Patent Application Publication 2004/0182359, issued to Stewart, et al., individual cylinders may be switched between combustion modes to allow use of HCCI combustion over a wider load and speed range. In another approach, as described in U.S. Pat. No. 6,390,054, issued to Yang, two different groups of cylinders may be transitioned between combustion modes in different stages to allow more control over dynamic response.

However, the inventors herein have recognized disadvantages with these approaches. Specifically, by switching combustion modes the beneficial aspects of HCCI combustion are only enjoyed over a limited range of operating conditions. Additionally, in HCCI engines, as engine load increases ignition typically advances and changes combustion rates, thermal efficiency and harshness, yet while engine load decreases, ignition typically retards and can result in misfiring and increased emissions. Also, HCCI combustion typically generates low emissions of nitrogen oxides (NOx) due mainly to lower combustion temperatures, but it can generate relatively high hydrocarbon (HC) and carbon monoxide (CO) emissions and can generate higher levels of NOx emissions at higher engine speeds and larger engine loads. Additionally, lean burn engines typically operate outside of the optimal range of operation for typical emissions control devices such as 3-way catalytic converters and may require use of expensive emissions control devices such as NOx trap catalytic converters.

The inventors herein have recognized the above-mentioned disadvantages and have developed a system that improves operating ranges and emission control for HCCI combustion engines.

SUMMARY

One example approach to overcome at least some of the disadvantages of prior approach includes a method for controlling an air-to-fuel ratio in an internal combustion engine having a plurality of cylinders using electronic valve actuation by operating a first portion of the cylinders in a homogeneous charge compression ignition (HCCI) mode, operating a second portion of the cylinders in a non-HCCI mode, combusting an air and fuel charge in the second portion of cylinders, and holding the combusted air and fuel charge in the second portion of cylinders and exhausting the combusted air and fuel charge to adjust the overall residual air-to-fuel ratio of the engine exhaust.

In a second approach, also described herein, the above issues may be addressed by a system for controlling a multiple cylinder internal combustion engine having a plurality of cylinders with electronically actuated valves, the system having a first portion of cylinders to operate in a homogeneous charge compression ignition (HCCI) mode, a second portion of cylinders to operate in a non-HCCI mode, and an engine controller operably coupled to the first and second portions of cylinders, said controller configured to actuate the valves to hold a combusted air and fuel charge in the second portion of cylinders, and exhaust the combusted air and fuel charge to adjust the overall residual air-to-fuel ratio of the engine exhaust.

The present description provides several advantages. In particular, by balancing the combined residual air-to-fuel ratio, a standard 3-way catalyst can be used without the need for an expensive NOx adsorber. Another advantage is that an engine can be run over a larger range of conditions in HCCI mode yet still provide greater control over the residual air-to-fuel ratio. The above advantages and other advantages, and features of the present description will be readily apparent from the following Detailed Description when taken alone or in connection with the accompanying drawings.

DETAILED DESCRIPTION

Figure 1:
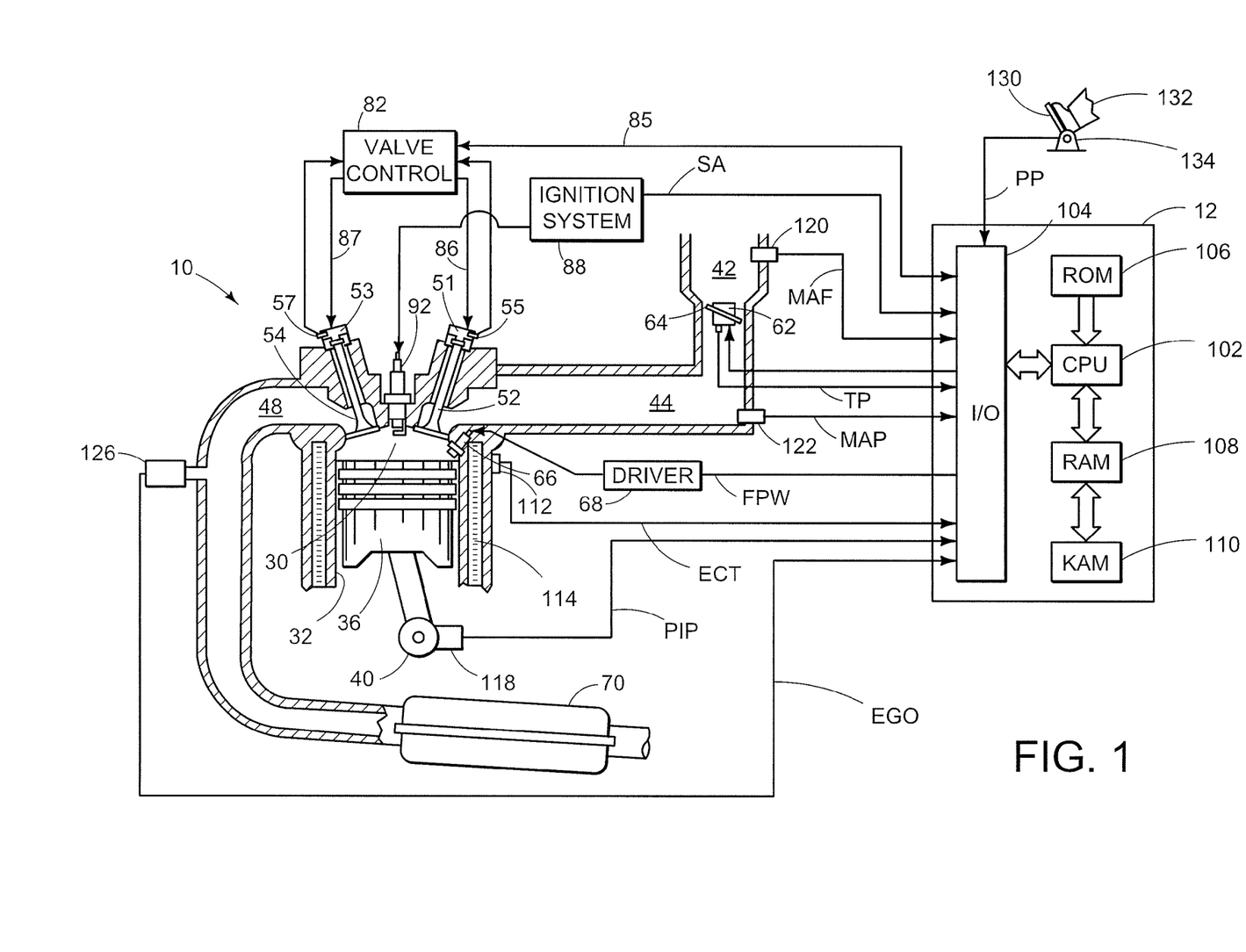
FIG. 1 is a schematic diagram of a portion of an example internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via valve controller 82 and electric valve actuator (EVA) 51. Valve controller 82, also called a slave controller or valve control unit (VCU), is shown coupled with controller 12 over link 85, but other embodiments may include more than 1 valve controller 82, or may use controller 12 to control the valves directly. In some embodiments link 85 is a high speed control area network (CAN) operating at 500 kbit/sec data bandwidth, but embodiments are not so limited and may operate at other speeds or may be other communication channels that adequately provide data transfer between controller 12 and one or more valve controllers 82. Valve controller 82 is in communication with electronic valve actuators 51 and 53 through links 86 and 87 and controls the opening and closing of the respective intake valve 52 and exhaust valve 54. Similarly, exhaust valve 54 may be controlled by controller 12 via valve controller 82 and EVA 53.

During some conditions, valve controller 82 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example.

Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark or spark plug 92.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Emission control device 70 is shown arranged along exhaust passage 48 downstream of exhaust gas sensor 126. Device 70 may be a three way catalyst (TWC), NOx adsorber (NOx trap), various other emission control devices, or combinations thereof. In some embodiments, during operation of engine 10, emission control device 70 may be periodically reset by operating at least one cylinder of the engine within a particular air/fuel ratio. In some embodiments, exhaust passage 48 may have only a three way catalyst, or may be any other configuration without a NOx trap.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus.

Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa.

During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. As described above, FIG. 1 shows only one cylinder of a multi-cylinder engine, and that each cylinder may similarly include its own set of intake/exhaust valves, fuel injector, spark plug, etc.

Figure 2A:
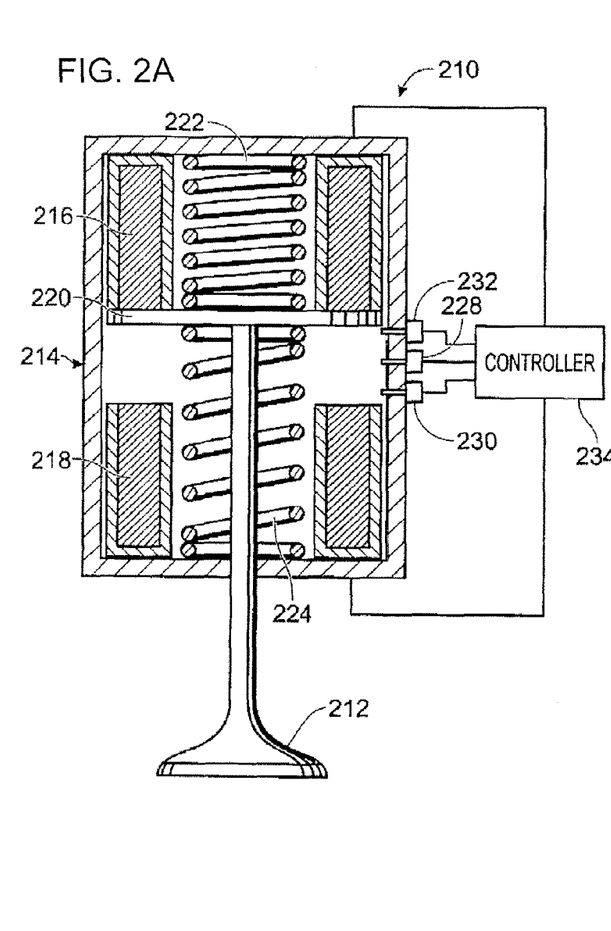
FIGS. 2A and 2B are schematic diagrams of an example electric valve actuation system in a first position and a second position.
Figure 2B:
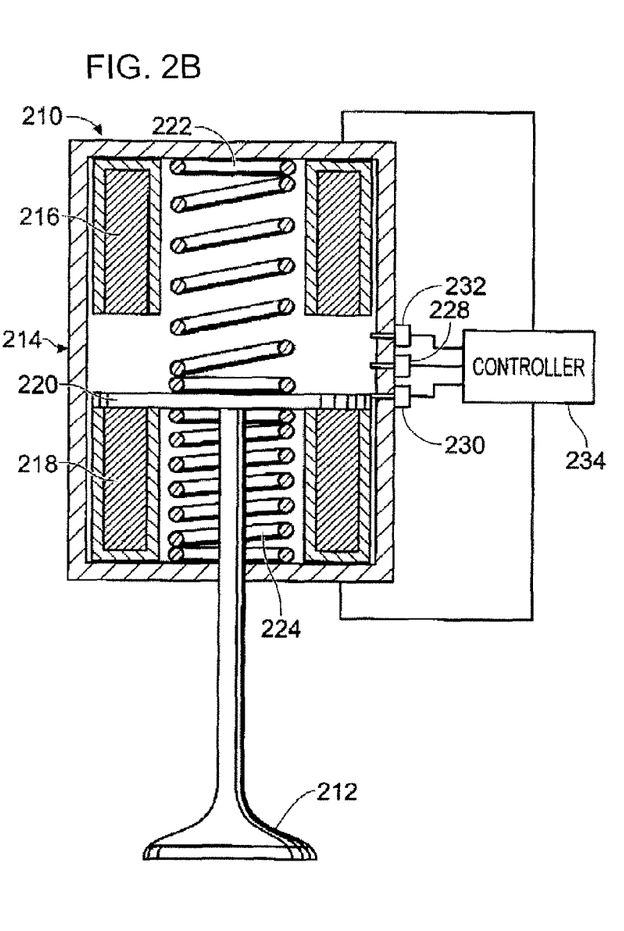
Figure 2C:
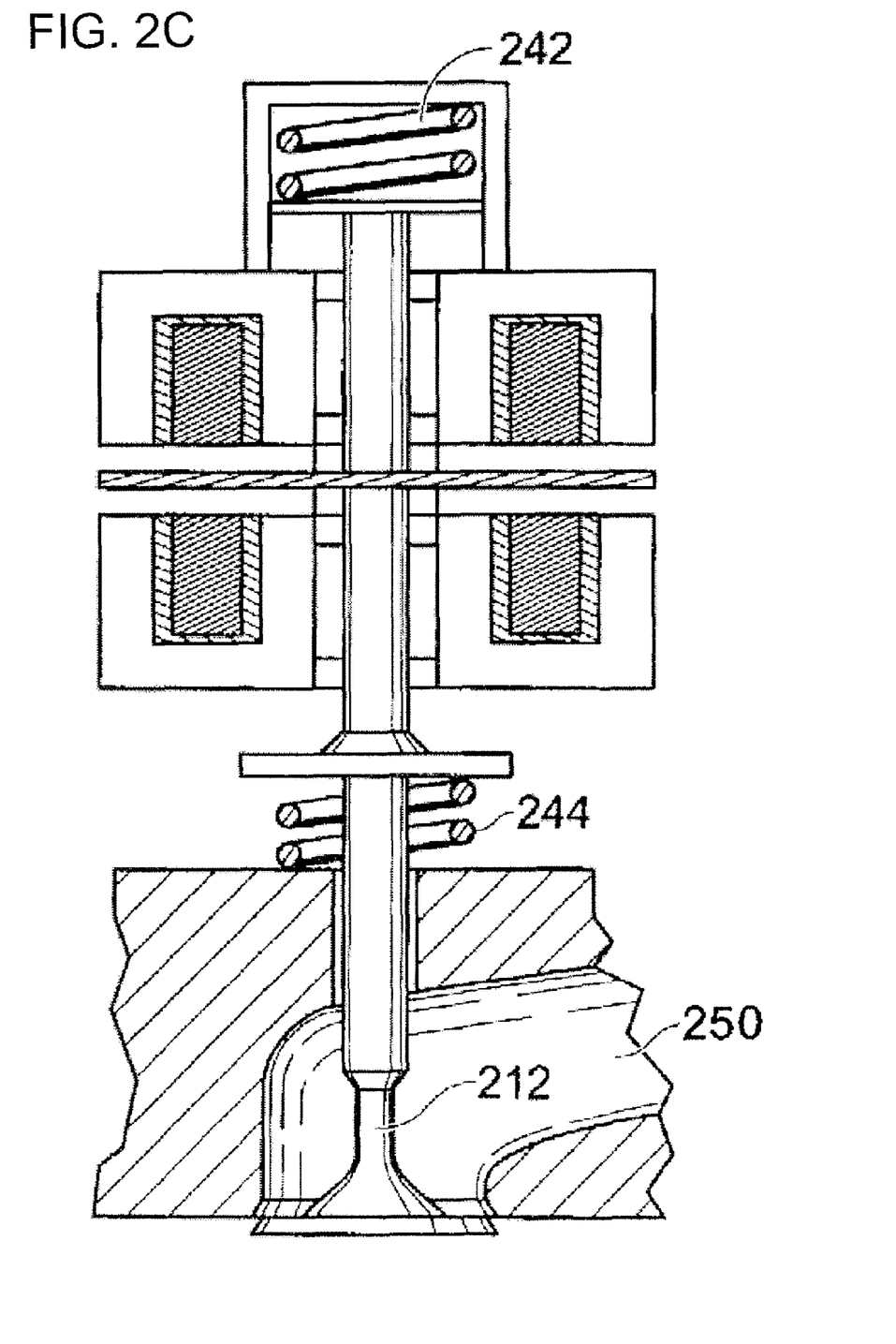
FIG. 2C is a schematic diagram of an example electric valve actuation system as further described in this disclosure.

FIGS. 2A, 2B, and 2C show a detailed view of an EVA system and valve that may be used as one of the intake or exhaust valves described above with reference to FIG. 1. Referring to FIGS. 2A and 2B, an EVA system 210 is shown for controlling movement of a valve 212 of a cylinder between a fully closed position (shown in FIG. 2A), and a fully open position (shown in FIG. 2B). The apparatus 210 includes an electric valve actuator (EVA) 214 with upper and lower coils 216 and 218 which electromagnetically drive an armature 220 against the force of upper and lower springs 222 and 224 for controlling movement of the valve 212.

One or more sensors 228, 230, and 232 may be provided for detecting a position, velocity and/or acceleration of armature 220. As one embodiment, at least one of sensors 228, 230, and 232 may include a switch type sensor that detects when armature 220 passes within a region of the sensor. In some embodiments, at least one of sensors 228, 230, and 232 may provide continuous position, velocity, and/or acceleration data to the control system for the armature and/or valve position.

Controller 234, which can be combined into controller 12, or act as a separate controller portion of the control system is shown operatively connected to position sensors 228, 230, and 232, and to the upper and lower coils 216 and 218 to control actuation and landing of valve 212. As described above, engine 10 has one or more electric valve actuators that may be used to vary the lift height, lift duration, and/or opening and closing timing in response to operating conditions of the engine.

FIG. 2C shows an alternative embodiment of an EVA system including a dual coil oscillating mass actuator with an engine valve actuated by a pair of opposing electromagnetic coils (e.g. solenoids), which are designed to overcome the force of a pair of opposing valve springs 242 and 244 arranged differently than the actuator of FIGS. 2A and 2B. Other components of the electric valve actuation system of FIG. 2C may be similar to those of FIGS. 2A and 2B, except that FIG. 2C shows port 250, which can be an intake or exhaust port of a cylinder of the engine. Applying a variable voltage to the coil of the electromagnet induces current to flow, which controls the force produced by each electromagnet. With some EVA systems, each electromagnet that makes up an actuator may be only able to produce a force in one direction, independent of the polarity of the current in its coil.

As illustrated above, the electrically actuated valves in the engine may remain in a half open position when the actuators are de-energized (e.g. no current is supplied). Therefore, prior to a combustion operation of the cylinder, each valve may go through an initialization cycle. During an initialization cycle, the actuators can be pulsed with current, in a prescribed manner, in order to establish the valves in the fully closed or fully open position. Further, as will be described below in greater detail, the initialization cycle may include a determination of a base level of holding current for one or more magnetic coils of the EVA system.

Following this initialization, the valves can be sequentially actuated according to the desired valve timing and firing order by the pair of electromagnetic coils, a first electromagnetic coil (e.g. the lower coil) for pulling the valve open and a second electromagnetic coil (e.g. the upper coil) for pulling the valve closed.

The magnetic properties of each electromagnet may be such that only a single electromagnetic coil (upper or lower) need be energized at any time. Since one of the coils (e.g. the upper coil) holds the valve closed for the majority of each engine cycle, it may be operated for a much higher percentage of time than that of the other coils (e.g. the lower coil).

Referring back to FIG. 1, engine 10 has cam-less independently variable intake and exhaust valves. This methodology could apply to any combination of variable intake and/or exhaust valve trains as well as EVA and mechanically driven valves. In the present embodiment, the valves are actuated using valve controller 82 where controller 12 may be the vehicle ECU and referred to as the master controller or master ECU.

Figure 3:
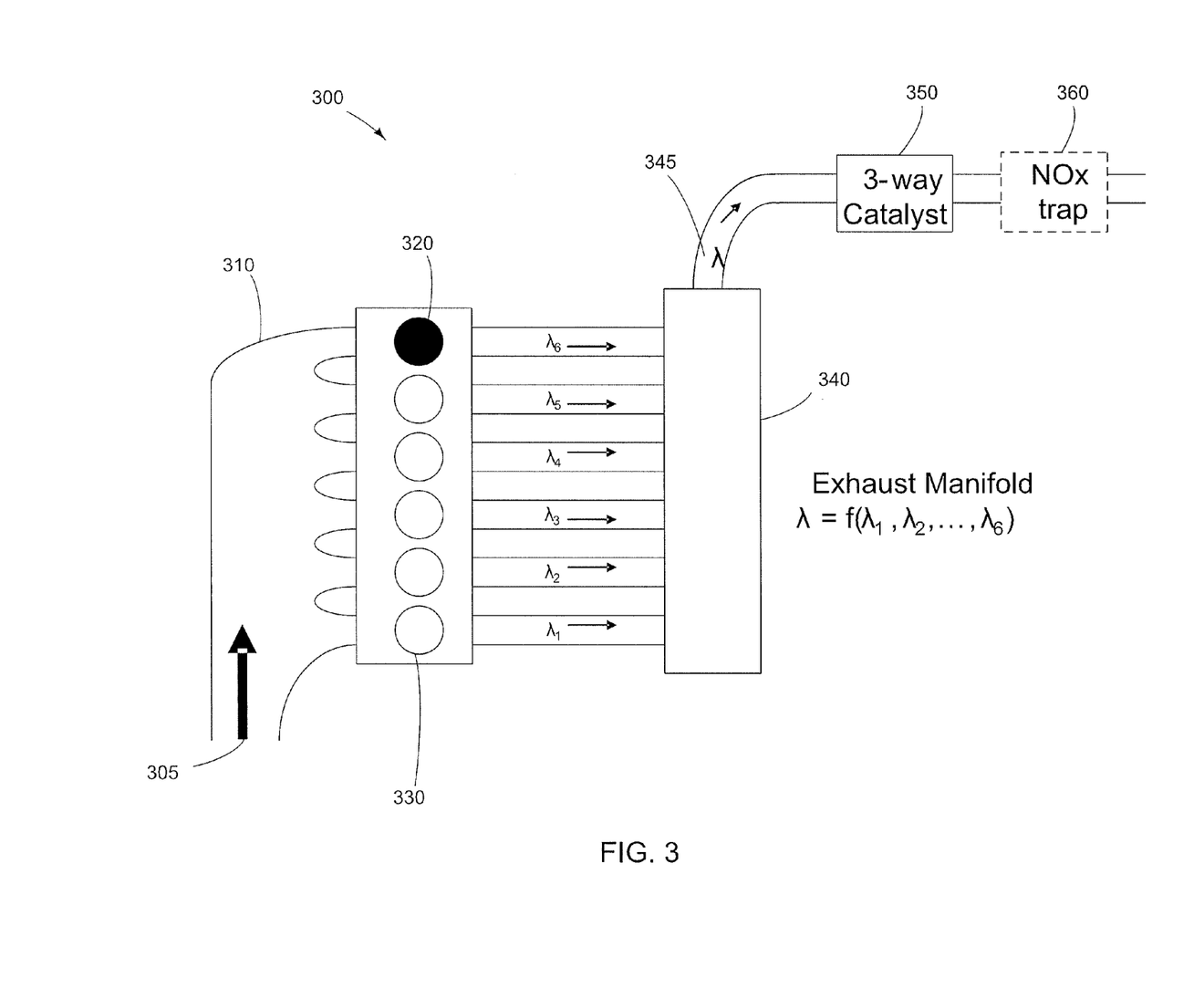
FIG. 3 is a schematic diagram of an engine that can use a non-HCCI cylinder to control emissions.

FIG. 3 is a schematic diagram of an engine system 300 that can use a non-HCCI cylinder to control emissions. Intake air (or air/fuel mixture) 305 enters intake manifold 310 and is introduced to the cylinders in engine block 322 through valves as illustrated in FIGS. 1-2C. Engine block 322 may be any multiple cylinder engine configuration including multiple blocks that use a common exhaust. The engine block 322 illustrated in FIG. 3 is a 6-cylinder block with a characteristic HCCI mode cylinder 330, four other HCCI mode cylinders, and non-HCCI mode cylinder 320. Other embodiments may use different portions of the overall cylinders in either mode and are not limited to the embodiment illustrated in FIG. 3. An air/fuel charge in each cylinder is then combusted and the residual air-to-fuel ratio is represented with $\lambda$ values 1-6. The combined residual air-to-fuel ratio 345 is a function of each of the $\lambda$ values 1-6. The exhaust then enters exhaust manifold 340 and the combined residual air-to-fuel ratio 345 undergoes aftertreatment. In the present embodiment, cylinder 320 operates in a non-HCCI mode to provide a different residual air-to-fuel ratio than the HCCI cylinders in order to balance the overall residual air-to-fuel ratio to some set point. In some embodiments, the set point of the overall air-to-fuel ratio can be a range at or near stoichiometry. For example, non-HCCI cylinder 320 can hold a combusted low air-to-fuel ratio (rich) charge using electronically actuated valves illustrated in FIG. 1-FIG. 2C, and in response to deviations in the residual air-to-fuel ratio 345 in exhaust manifold 340, the non-HCCI cylinder can provide the rich exhaust to adjust the combined residual air-to-fuel ratio 345.

Engine system 300 includes 3-way catalyst 350 and a NOx adsorber such as NOx trap 360, but other embodiments are not so limited and can balance emissions as explained herein. For example, other embodiments may provide substantially stoichiometric exhaust and therefore include only the 3-way catalyst 350. Other embodiments may include different catalytic converter configurations, other aftertreatment, or potentially have no aftertreatment.

Figure 4:
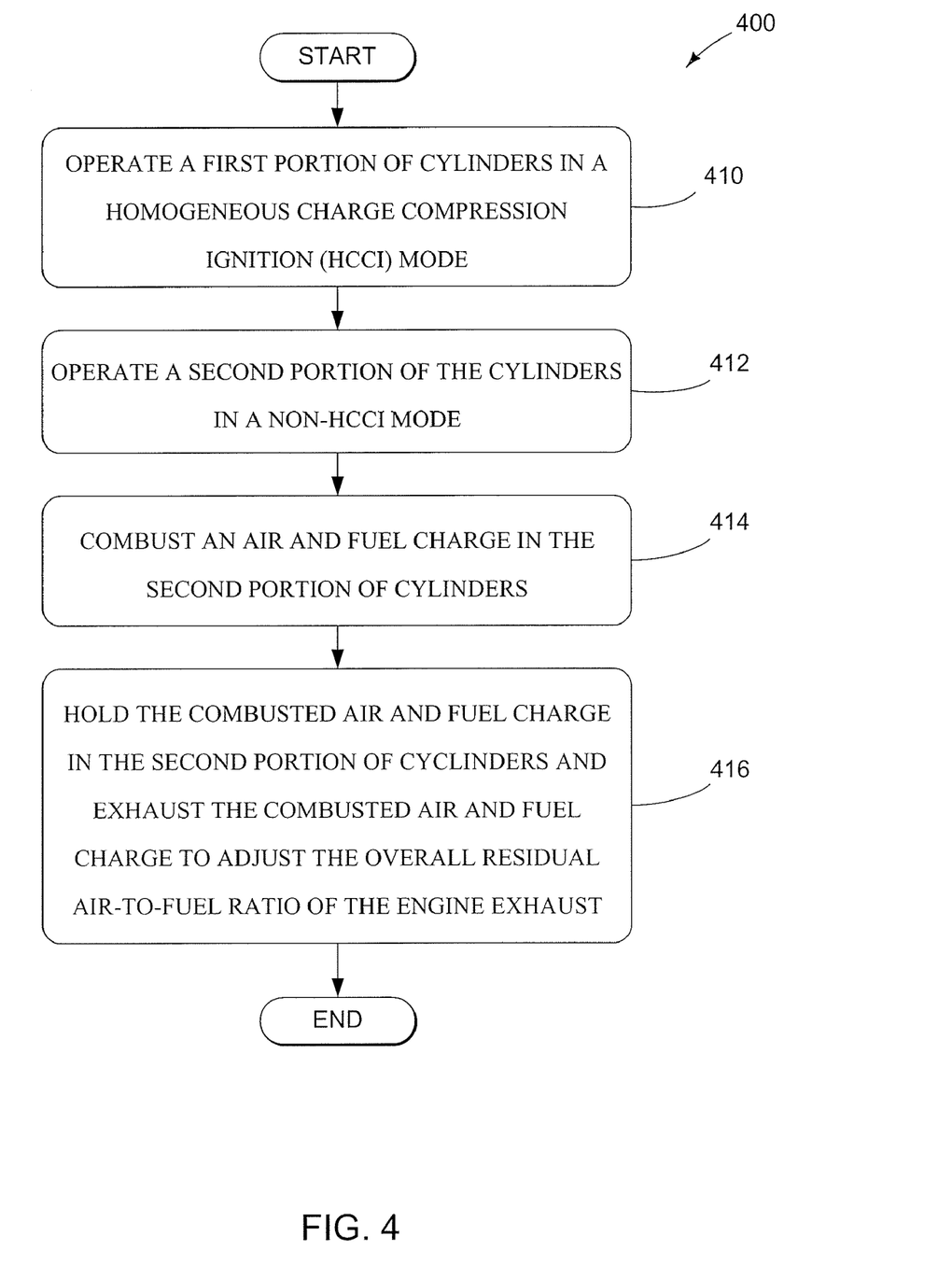
FIG. 4 is a flow diagram of an embodiment method for controlling an air-to-fuel ratio in an electronic valve actuation engine.

FIG. 4 is a flow diagram of an embodiment method 400 for controlling an air-to-fuel ratio in an electronic valve actuation engine. In block 410, the method operates a first portion of cylinders in an engine using an HCCI combustion mode. In one embodiment, this first portion of cylinders may be all of the cylinders of the engine except one cylinder operating in a non-HCCI mode. In block 412, a second portion of cylinders is operated in a non-HCCI mode. In block 414, the method then combusts an air and fuel charge in the second portion of cylinders. In block 416, method 400 then holds the combusted air and fuel charge in the second portion of cylinders and exhausts the combusted air and fuel charge to adjust the overall residual air-to-fuel ratio of the engine exhaust. For example, the second portion of cylinders can hold a combusted low air-to-fuel ratio charge for a plurality of cylinder cycles, and in response to overall air-to-fuel ratio deviating from a set range, the second portion of cylinders can exhaust the low air-to-fuel ratio charge to balance engine emissions when required, generally within one piston stroke. In other words, once it is desired to exhaust the charge from a cylinder in the second portion, as soon as a piston is on an up-stroke, the corresponding exhaust valve can be opened to exhaust the combusted mixture. Further, the exhaust valve timing may be adjusted to account for where in the piston stroke the valve is opened, to provide a desired amount of exhausted charge. Further, the amount of exhaust charge may be varied based on a size or level of disturbance generated by the first portion of cylinders that is to be corrected. If the residual air-to-fuel ratio is at or near stoichiometry, method 400 may operate without a NOx adsorber, such as NOx trap 360 illustrated in FIG. 3.

Figure 5:
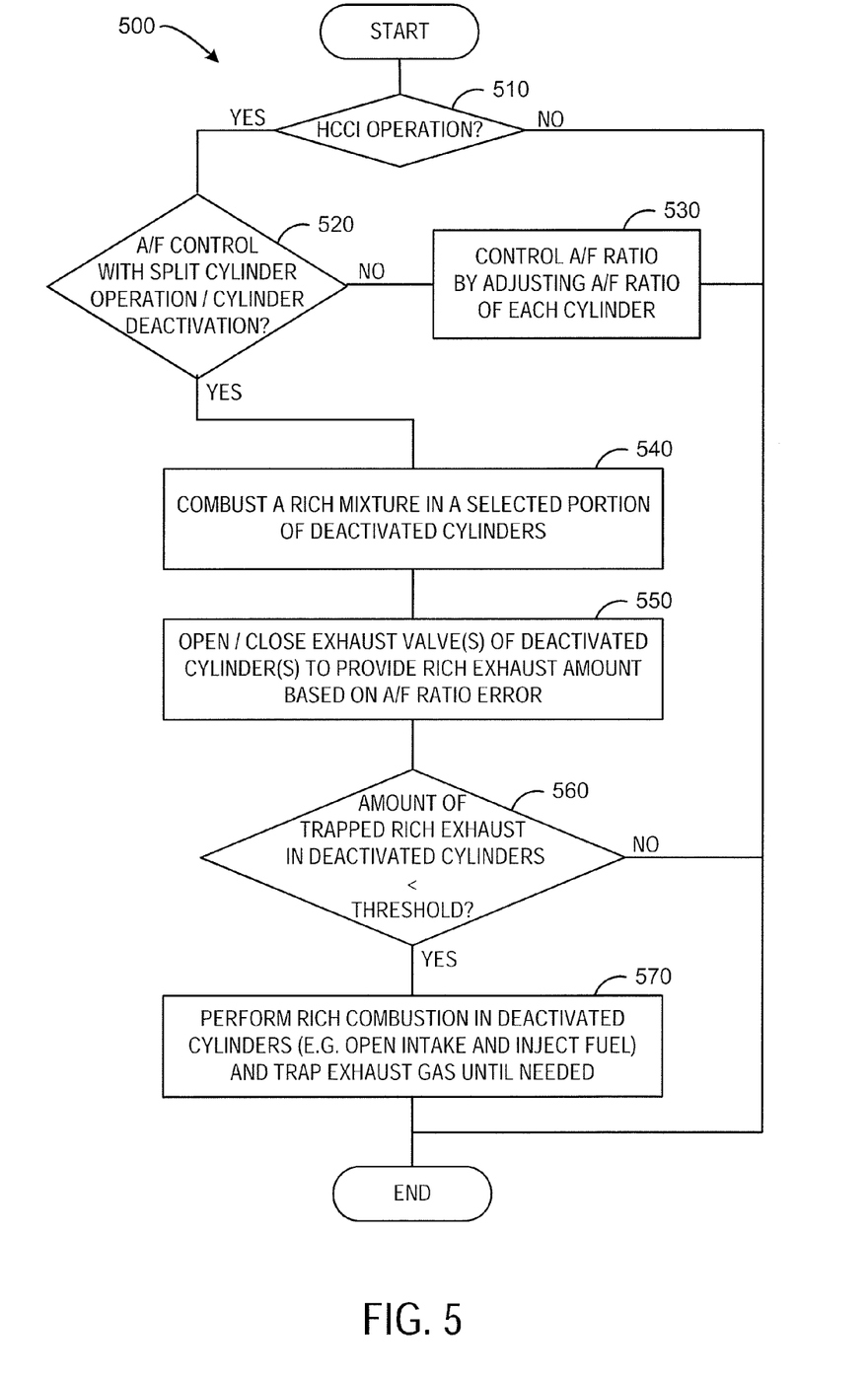
FIG. 5 is a flow diagram of an embodiment method for holding combusted gases in a portion of cylinders to be used to adjust an overall engine exhaust gas air to fuel ratio.

FIG. 5 is a flow diagram of an embodiment method 500 for holding combusted gases in a portion of cylinders to be used to adjust an overall engine exhaust gas air to fuel ratio. After starting, in block 510 the method queries if HCCI operation is being utilized. If not, then the method may end or run in a loop at block 510 until HCCI operation is utilized. Method 500 may operate in a split cylinder operation, where some cylinders combust in an HCCI mode and some either combust in another mode or are temporarily non-combusting cylinders. Additionally, method 500 may transition some of the cylinders between combustion modes.

During HCCI operation, if air-to-fuel control is not being used with split cylinder operation/cylinder deactivation in decision block 520, then the method controls the air-to-fuel ratio by adjusting the air-to-fuel ratio of each cylinder in block 530. If the method is controlling the air-to-fuel ratio with split cylinder operation/cylinder deactivation, then a rich mixture is combusted in a selected portion of deactivated or non-HCCI cylinders in block 540. In an example, a controller may receive a signal indicating exhaust gases are lean. In response to detecting the exhaust gases are operating outside a desired range or set-point, the controller can determine a desired A/F ratio to inject into the non-HCCI cylinders to combust and hold. Further, the controller can adjust the electronically actuated valves to release rich combusted exhaust gases from one or more of the non-HCCI cylinders to balance the lean exhaust gases from the HCCI cylinders. In block 550, the method opens or closes at least one exhaust valve of the deactivated cylinders to provide rich exhaust. Further, the degree of richness may be selected based on various operating conditions, such as the number of cylinders in each operating mode, etc.

In some embodiments, the amount of rich exhaust provided in block 550 may be based on a set point, or on an air-to-fuel ratio deviation from the set-point. An example embodiment may use a sensor in the exhaust manifold, to detect the residual A/F ratio in exhaust from the combination of HCCI mode cylinders. According to how much the residual A/F ratio needs to be adjusted, EVA allows precise actuation of valve lift, duration and/or timing to adjust the amount of rich exhaust gas released from the non-HCCI cylinder(s) that is needed to reach a set-point for an overall engine residual A/F ratio. Further, in block 560 an embodiment method may determine if the amount of trapped rich exhaust in at least one deactivated or non-HCCI cylinder, is below a certain threshold. If it is below a certain threshold, the embodiment method may perform additional rich combustion in the deactivated cylinder(s) and trap the rich exhaust gas until needed.

Some advantages of using an EVA engine with partial non-HCCI operation in the manner described herein include the ability to quickly adjust the residual A/F ratios using EVA to hold already combusted rich gases in at least one non-HCCI mode cylinder. By holding already combusted gases in a cylinder, rich exhaust gases may be provided on the next available cycle of the cylinder holding the combusted gases instead of waiting extra cycles to intake a new rich charge, combust it, and exhaust it. Further, for embodiments with multiple cylinders in non-HCCI mode, the amount of rich exhaust gases may be adjusted by adjust the number of cylinders storing or exhausting the rich combusted gases.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

I claim:

1. A method for controlling an exhaust air-to-fuel ratio in an internal combustion engine having a plurality of cylinders using electronic valve actuation, comprising:
    operating a first portion of the cylinders in a homogeneous charge compression ignition (HCCI) mode;
    operating a second portion of the cylinders in a non-HCCI mode;
    combusting an air and fuel charge in the second portion of cylinders; and
    holding the combusted air and fuel charge in the second portion of cylinders and exhausting the combusted air and fuel charge to adjust the overall residual air-to-fuel ratio of the engine exhaust.

2. The method of claim 1, wherein the second portion of cylinders is a single non-HCCI mode cylinder.

3. The method of claim 1, wherein at least one of the second portion of cylinders holds a low air-to-fuel ratio charge sealed in the cylinder, and in response to overall air-to-fuel ratio deviating from a set range, the second portion of cylinders exhausting the low air-to-fuel ratio charge to balance engine emissions, and where an air-to-fuel ratio of combustion of the air and fuel charge in the second portion of cylinders is varied with operating conditions including a number of cylinders in the first portion of cylinders.

4. The method of claim 3, further comprising operating the internal combustion engine without an NOx adsorber catalytic converter.

5. The method of claim 3, wherein the set range includes stoichiometry.

6. The method of claim 1 further comprising, measuring the residual air-to-fuel ratio from the first portion of cylinders and adjusting the air-to-fuel ratio of the charge in the second portion of cylinders in response to the measured residual air-to-fuel ratio from the first portion of cylinders.

7. A system for controlling a multiple cylinder internal combustion engine having a plurality of cylinders with electronically actuated valves, comprising:
 a first portion of cylinders to operate in a homogeneous charge compression ignition (HCCI) mode;
 a second portion of cylinders to operate in a non-HCCI mode; and
 an engine controller operably coupled to electronically actuated valves of the first and second portions of cylinders, said controller configured to actuate the valves to hold a combusted air and fuel charge in the second portion of cylinders for at least a plurality of cylinder cycles, and exhaust the combusted air and fuel charge to adjust the overall residual air-to-fuel ratio of the engine exhaust in response to a disturbance air-fuel ratio error in the first portion of cylinders, where an exhaust valve timing of cylinders in the second portion of cylinders is adjusted to vary an amount of combusted air and fuel charge exhausted based on a level of the disturbance and an air-fuel ratio of the combusted air and fuel charge.

8. The system of claim 7, wherein the second portion of cylinders is a single non-HCCI mode cylinder.

9. The system of claim 7, wherein at least one of the second portion of cylinders holds a low air-to-fuel ratio charge sealed in the cylinder, and when an overall air-to-fuel ratio deviates from a set range, the second portion of cylinders exhausts the low air-to-fuel ratio charge to balance engine emissions.

10. The system of claim 9, wherein the internal combustion engine is not coupled to an NOx adsorber catalytic converter.

11. The system of claim 9, wherein the set range includes stoichiometry.

12. The system of claim 9, wherein the engine controller is further configured to measure the residual air-to-fuel ratio from the first portion of cylinders and adjust the air-to-fuel ratio of the charge in the second portion of cylinders in response to the measured residual air-to-fuel ratio from the first portion of cylinders.

13. A computer storage medium having instructions encoded therein for controlling an exhaust air-to-fuel ratio in an internal combustion engine having a plurality of cylinders using electronic valve actuation, said medium comprising:
 code to operate a first portion of the cylinders in a homogeneous charge compression ignition (HCCI) mode;
 code to operate a second portion of the cylinders in a non-HCCI mode;
 code to combust a rich air and fuel charge in the second portion of cylinders;
 code to hold the combusted rich air and fuel charge in the second portion of cylinders for a plurality of cylinder cycles and exhaust the combusted air and fuel charge to adjust the overall residual air-to-fuel ratio of the engine exhaust in response to air charge deviations and/or fueling deviations in the first portion of the cylinders; and
 code to replenish the rich air and fuel charge with additional combustion events in the second portion of cylinders when an amount of rich air and fuel charge falls below a threshold.

14. The computer storage medium of claim 13, wherein the second portion of cylinders is a single non-HCCI mode cylinder performing spark combustion of the rich air and fuel charge, and otherwise operating without combustion.

15. The computer storage medium of claim 13, wherein at least one of the second portion of cylinders holds a low air-to-fuel ratio charge sealed in the cylinder, and in response to overall air-to-fuel ratio deviating from a set range, the second portion of cylinders exhausts the low air-to-fuel ratio charge to balance engine emissions.

16. The medium of claim 15, wherein the internal combustion engine does not have an NOx adsorber catalytic converter.

17. The medium of claim 15, wherein the set range includes stoichiometry.

18. The medium of claim 15, further comprising code to measure the residual air-to-fuel ratio from the first portion of cylinders and adjust the air-to-fuel ratio of the charge in the second portion of cylinders in response to the measured residual air-to-fuel ratio from the first portion of cylinders.

* * * * *